C. P. HOLLISTER.
CLUTCH.
APPLICATION FILED DEC. 7, 1908.
928,656.
Patented July 20, 1909.
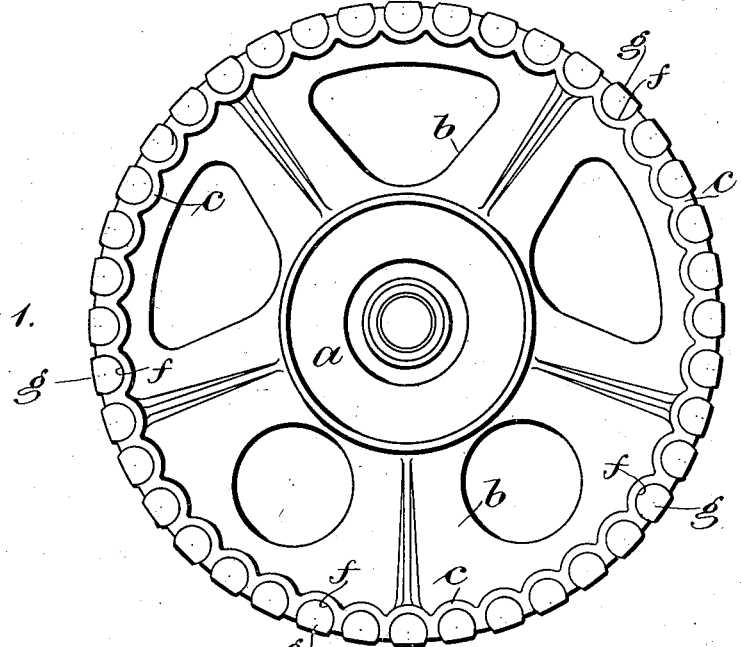
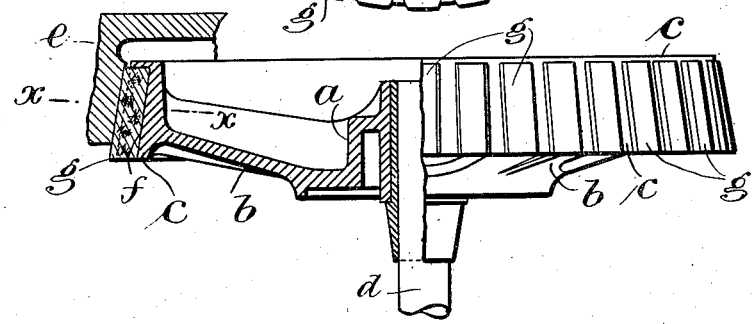
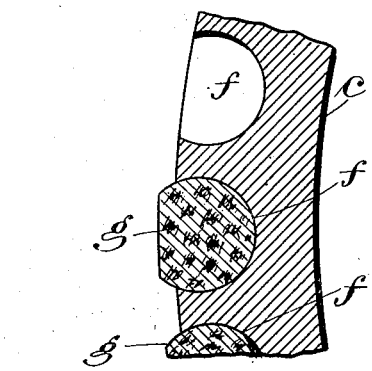
Witnesses
Chas H Smith
A D Serrell
Inventor
Clarence P. Hollister.
by Harold Serrell
his Atty

UNITED STATES PATENT OFFICE.

CLARENCE P. HOLLISTER, OF PITTSFIELD, MASSACHUSETTS, ASSIGNOR TO STILSON MOTOR CAR COMPANY, OF PITTSFIELD, MASSACHUSETTS, A CORPORATION OF MASSACHUSETTS.

CLUTCH.

No. 928,656.　　　Specification of Letters Patent.　　　Patented July 20, 1909.

Application filed December 7, 1908. Serial No. 466,210.

*To all whom it may concern:*

Be it known that I, CLARENCE P. HOLLISTER, a citizen of the United States, residing at Pittsfield, in the county of Berkshire and State of Massachusetts, have invented an Improvement in Clutches, of which the following is a specification.

My invention relates to a clutch or friction device adapted for use in connection with the power transmission of automobile or other engines, or the driving or braking devices of machinery or mechanical structures generally.

Heretofore many devices adapted for friction driving or braking have been provided with leather surfaces upon a metal backing, with holes through the leather and into the metal that are filled with blocks of cork inserted under pressure and protruding for frictional engagement. These corks need renewal from time to time as worn out, and special mechanism is required to remove them and insert new corks under pressure, and it is also necessary to dismember the mechanism to obtain access to the surface of the clutch or braking devices for this purpose, all of which it is the object of my invention to overcome.

In carrying out my invention, the clutch or other friction device is provided with series of apertures formed into and along the contact face from one edge parallel with the face. These apertures are preferably circular in cross section, their axis is parallel with the contact face and within said face so that the apertures cut through said face leaving about two-thirds of the nominal area of such apertures in the metal of the clutch or other friction device. Where the clutch is a wheel with an inclined face, these apertures are arranged in a circumferential series with their open ends on the outer face of the wheel. Elongated cylindrical corks of standard size are employed and they are inserted endwise in such apertures by hand, thus leaving about one-third of the circumference exposed beyond the surface of the clutch to bear upon the surface with which the clutch contacts in braking or transmission; the compressive action of which causes the corks to tightly fill the apertures. These corks may be pulled out endwise by a cork-screw without dismantling any of the associated or co-acting devices.

The drawing illustrates an important form of my invention, in which—

Figure 1 is an elevation of a wheel-clutch, Fig. 2 a partial edge view and central section of the same, and Fig. 3 a broken central section at about the dotted line $x$, $x$, of Fig. 2 through the rim of the wheel.

The clutch-wheel comprises the hub $a$, spokes $b$ and rim $c$; the hub $a$ receiving a shaft $d$, and $e$ represents a part of the fly-wheel with an inner surface with which the surface of the clutch-wheel is adapted to come into frictional engagement.

The device of my invention as illustrated in the drawing, is particularly adapted for use with automobile engines in connection with which the fly-wheel $e$ is on the shaft directly rotated by the engine mechanism, while the clutch-wheel is on the shaft of the transmission, and when the vehicle is still the clutch is disengaged and the engine meanwhile may be running. In the periphery of the clutch-wheel I provide a series of circumferentially disposed apertures $f$. These are formed in the rim from the outer side of greatest diameter. The openings are preferably circular and are bored into the rim from the outer face toward the inner surface but not longitudinally through. About two-thirds of the normal cross sectional area of the openings is in the flange or periphery of the wheel, cutting the periphery through into grooves of less width than the diameter of the openings and thereby leaving retaining edges or lips; the axis of the apertures being parallel with the periphery of the wheel. Into these openings I insert elongated cylindrical corks $g$ of a standard size and form. They are inserted endwise and may be forced by the gentle pressure of the hand into the openings, down to their seats and in place, and when in place about one-third of the sidewise area of the corks projects above the surface or periphery of the wheel, as clutch surfaces engaged by the other member of the clutch. These surfaces may in the manufacture of a clutch-wheel be paired down so as to present flat faces for contact against the frictional surface of the fly-wheel, and the pressure produced by the frictional contact has a tendency to press the cork, consolidate the same and cause it to fully fill the apertures occupied thereby in the wheel. From the drawings the position of these corks will be appreciated, and it will be noticed that it is unnecessary to remove any of the parts or the clutch from its shaft, or to dismember the mechanism in order to obtain access to the corks in case they become worn out and require to be replaced, for to replace any one or more of the corks, it is only necessary to employ a cork-screw brought up against one end of the cork in the line of the axis thereof and employed to engage the cork in its aperture and pull the same straight out, after which a new cork can be inserted. It is preferable in inserting new corks to remove a number spaced apart from the periphery of the wheel and to replace them with new corks and leave the full surface of the corks projecting above the periphery of the clutch-wheel to engage the surface of the fly-wheel and be worn down in use, and this can be gradually repeated until a complete new series of corks have been inserted or have been worn down to the same level, at which time the clutch-wheel will be in the same condition with the corks as in a new wheel.

The corks placed in the manner of my invention do not wear out as fast or disintegrate as quickly as corks exposed with the end grain as has heretofore been the custom in clutches, for the grain as presented in the cylinder is more tenacious across the grain than with the grain.

While I have shown in the drawing one of and perhaps the principal application of my invention, I do not wish to be limited or confined to this application in clutch-wheels for automobile machines, as my invention is equally well adapted for other forms or clutches and braking devices in which in relation to the surface thereof, the holes will be made in like manner and the corks inserted and removed in like manner and the invention be just as efficient in such devices as in the form shown.

I claim as my invention:

1. As a new article of manufacture, a friction device such as a clutch, having a series of apertures formed in the rim thereof from the outer face parallel with and cutting through the periphery or contact surface of such device and forming grooves therein, and elongated corks in such apertures inserted endwise with longitudinal portions extending through said grooves as clutch surfaces.

2. As a new article of manufacture, a friction-clutch wheel having a series of circumferentially arranged circular apertures formed in the rim of the wheel from the outer face, parallel with and cutting through part of the face or periphery of such wheel, with the axis of the apertures parallel with the face of the wheel, and elongated cylindrical corks in such apertures inserted end-wise and having bearing portions or clutch surfaces extending beyond its surface or periphery.

3. As a new article of manufacture, a friction-clutch wheel having a rim with an inclined periphery or face, and a series of circumferentially arranged circular apertures formed in said rim from the outer face, with the axis of the apertures parallel with the face and the apertures cutting through part of the face but leaving about two-thirds of the nominal area of the apertures in the rim so as to form retaining edges or lips and elongated cylindrical corks in such apertures inserted end-wise from the outer face of the wheel and having longitudinal bearings or clutch surfaces comprising about one-third the area of the corks which extends beyond the surface or periphery of the wheel.

4. In a clutch, a removable wheel element or member with a projecting outer face and having a circumferential series of closely spaced openings in the periphery with retaining edges or lips adapted to receive removable friction producing members, parts of whose surfaces project as clutch contacts, the entrance of said apertures extending to the outer face of said revoluble wheel element and accessible for removal and the renewal of said friction producing members without the necessity of dismantling any of the clutch mechanism.

5. In a clutch, a removable wheel element or member with a projecting outer face and having a circumferential series of closely spaced circular openings formed in and from the outer face, cutting the periphery in parallel sided openings, with retaining edges or lips adapted to receive renewable friction producing elongated cylindrical members, parts of whose surfaces project as clutch contacts, the entrance of said apertures in the outer face of said revoluble wheel element providing for the renewal of the said friction producing members without the necessity of dismantling any of the clutch mechanism.

Signed by me this 30th day of November 1908.

CLARENCE P. HOLLISTER.

Witnesses:
Wm. A. Burns,
Henry L. Dawes.